United States Patent
Smith

[15] 3,692,926
[45] Sept. 19, 1972

[54] ALIGNABLE END SEALS FOR A SPLICE CASE

[72] Inventor: Donald J. Smith, Canoga Park, Calif.

[73] Assignee: Smith-Schreyer & Assoc., Inc.

[22] Filed: July 6, 1971

[21] Appl. No.: 159,956

[52] U.S. Cl. ................. 174/92, 277/199, 174/77
[51] Int. Cl. ............................................. F16k 41/00
[58] Field of Search ............ 277/199, 66; 174/92, 77

[56] References Cited

UNITED STATES PATENTS 3,545,773  12/1970  Smith ..................... 277/199
3,337,681  8/1967   Smith ..................... 174/92
3,076,655  2/1963   Washburn ............. 277/66 UX Primary Examiner—Samuel B. Rothberg
Attorney—Lyon & Lyon

[57] ABSTRACT

A device for sealing the ends of a splice case. The device comprises two end seals rigidly fixed to each other by connecting members. Each end seal is made of two mating end pieces which are tightly clamped together about the cables by mechanical means. The connecting members provide alignment of the end seals during and after assembly of the splice case and provide a conducting path for the cable shields to bridge the splice.

15 Claims, 6 Drawing Figures

PATENTED SEP 19 1972 3,692,926

INVENTOR.
DONALD J. SMITH
BY Lyon & Lyon
ATTORNEYS

INVENTOR.
DONALD J. SMITH
BY
Lyon & Lyon
ATTORNEYS

ALIGNABLE END SEALS FOR A SPLICE CASE

BACKGROUND OF THE INVENTION

In U.S. Pat. No. 3,337,681 to Donald J. Smith there is disclosed a splice case for use in protecting cable splices from corrosion and the like. The details of such a splice case are fully set forth in the aforementioned patent, the disclosure of which is incorporated by reference herein. In U.S. Pat. No. 3,545,773 (the Smith patent) there is disclosed a basic end seal for a splice case. The present invention is derived from that basic end seal disclosed in the Smith patent.

The end seals disclosed in the Smith patent are each made of two end pieces which are semicircular hollow shells filled with foamed plastic, which itself is impervious to the passage of air. Channels are cut in each of the end pieces to accommodate one or more cables when the two end pieces are mated together. Suitable sealing material is positioned between the cable and the end pieces in the respective channels to insure a tight seal. The end pieces which are mated around the cables are held in position by the splice case which is subsequently placed around the splice and the end seals.

These and similar end seals are quite effective and easily installed in most cable splice applications. However, when large cables are to be spliced certain disadvantages become apparent. With large cable diameters, the force required to mate the two end pieces of each end seal becomes excessive. These forces required with large cables are too great for a man to provide without mechanical aid. Also, such forces distort the end pieces which can prevent an effective seal. A second disadvantage with existing seals when used with large cable sizes results from the fact that it is advantageous for easy handling and fabrication to reduce the proportionate thickness of the end seal with respect to its overall diameter for large diameters. Such a reduction in the relative thickness of the end seal results in a tendency for the end seal to become misaligned while assembling the splice case. This is especially true with the large cables because they are very rigid and comparatively inflexible.

SUMMARY OF THE INVENTION

An object of the present invention is to provide a device for sealing the ends of a cable splice enclosure through which the spliced cables pass. More specifically, the device is intended to solve the problems associated with the sealing of splices of large and very rigid cables where abnormal structural demands are required of the seal during fabrication and while in place. A second object of the present invention is to provide an electrical junction for the cable shields associated with the spliced cables. To accomplish the sealing function, the device provides a seal at each end of a splice case. Each seal is made of two mating end pieces which are semicircular shells filled with foamed plastic which is impervious to the passage of air. Provision is made for one or more cables to pass through the mated end pieces by cutting appropriate channels in each end piece. Appropriate sealing strips are positioned between the cable and the mating end pieces so that an interference fit is created when the end pieces are mated with the cables in place. To meet the structural requirements associated with large cables, an end piece support member is located about the perimeter of each mating end piece which lends structural rigidity to that end piece. Provided in the end piece support member are means for mechanically mating the two end pieces together. This mechanical tie provides further support to the seal thereby preventing the rigid cables from separating the two mated end pieces. The mechanical mating means also provide added force for creating and retaining sufficient pressure in the interference fit between the cable and the end pieces for an adequate seal.

Adjustable rigid mechanical linkages are employed which anchor into the end piece support members and which rigidly align the two assembled end seals relative to one another. These rigid members act to prevent misalignment of the end seals which becomes a problem with large cable splice applications. The increased probability of misalignment which exists with end seals having relatively large overall diameter to thickness ratios and with rigid cables that tend not to remain aligned with one another is thus greatly reduced. These alignment members also provide a means for bridging the various cable shield connections around the enclosed splice. Near each of the end seals, the cable shields are electrically connected to one of the alignment members which thereby effects an extended junction between the various cable shields. This insures that the grounded shield circuit will not come in contact with any part of the actual splice.

By designing both the end piece support members and the alignment members to run peripherally about the end pieces and through the case near the outer diameter, the advantage disclosed in the Smith patent of allowing a single end seal to handle one or several cables of many varying diameters has not been compromised.

The various structural members employed in the present invention have also facilitated the assembly of the complete cable splice enclosure. The alignment members act to hold the end seals which in turn hold the spliced cables and the splice itself while the side members for the cable splice enclosure are positioned. Before the employment of the present device, the side members had to be assembled about two end seals held together only by the semirigid or nonrigid splice. Thus, misalignment and damage to the splice occurring during assembly is prevented. Employment of the means for tying the two end pieces of each end splice together also aids in assembly. Before the present invention providing for each end seal to be independently held in the mated position by the mechanical tying means, the entire splice case had to be assembled before any of the various parts could be locked together. This is because the last parts to be assembled, the side members, acted alone to provide the structural means for mating the end pieces as well as fixing the end splices relative to each other. In summary, by this invention there is provided a novel device for providing a versatile cable splice seal which is capable of handling a variety of cables in both size and number and simultaneously providing structural means for insuring the structural integrity of the seal. It also assists in providing structural support to the splice itself by rigidly positioning the cables about the splice. Furthermore, the device aids in the assembly of the complete splice case by independently fixing the various parts relative to each other as the overall case is assembled. The dual function of the alignment members to act as a conductor for the shields to circumvent the splice is also of novel import.

The above and other objects and advantages of the present invention will become more apparent upon reference to the accompanying description and drawings in which:

DESCRIPTION OF THE PREFERRED EMBODIMENTS

Figure 1:
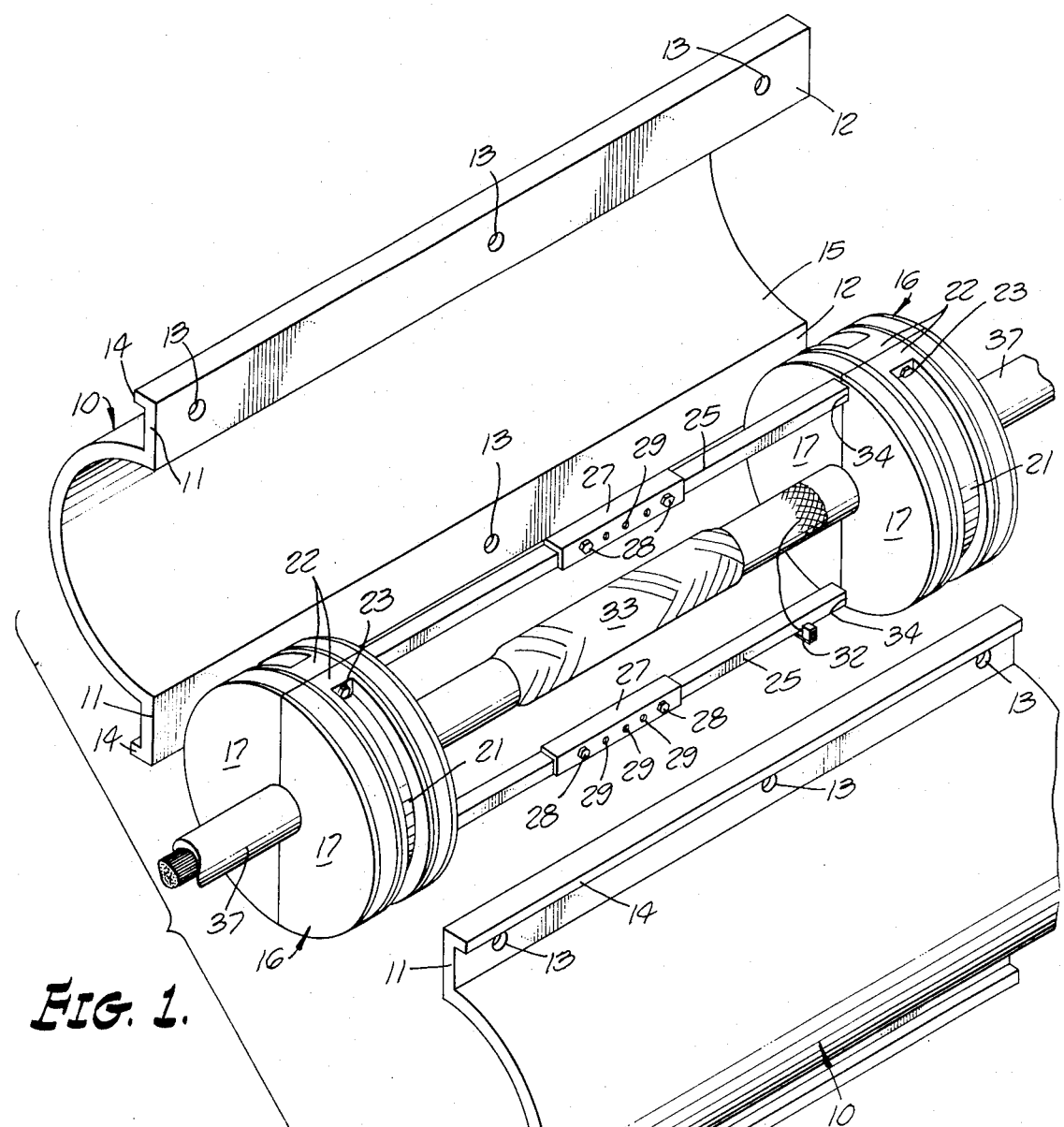
FIG. 1 is a partially assembled view of the splice case shown with a typical splice of two cables.
Figure 2:
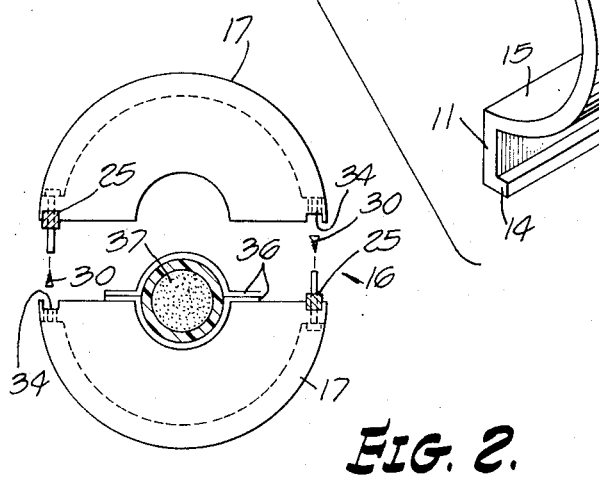
FIG. 2 is an end view of a partially assembled end seal.
Figure 3:
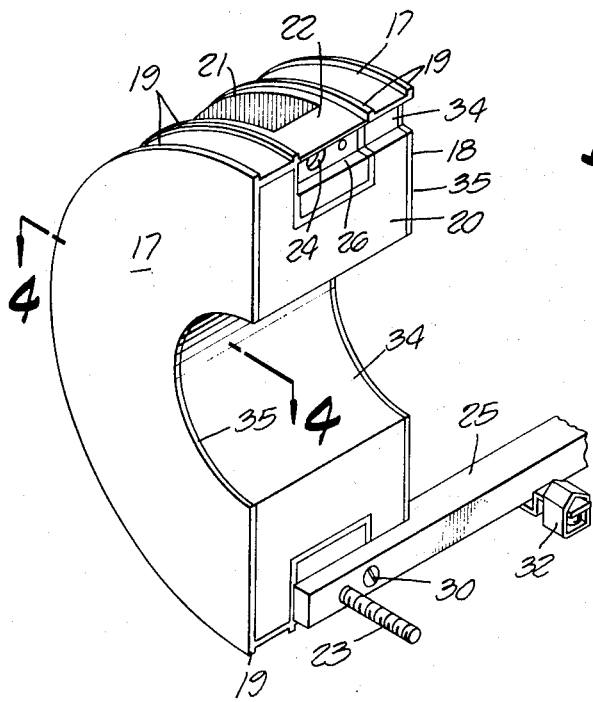
FIG. 3 is a perspective of one mating end piece shown with a channel already cut.

In the drawings, the body of the splice case is shown as two side members 10. Each side member 10 is formed in a semicircular shape with mating flanges 11 running the length of the semicircular side members. It is desirable to fabricate the side members 10 from a strong rigid material such as sheet metal or resilient plastic. The flanges 11 have flat mating surfaces 12 which are aligned in a plane running through the geometric center of the circle described by the inner surface of each side member 10 in order that a cylindrical inner surface will be formed when the two side members are assembled. Holes 13 are provided to allow the fastening of the side members 10 together using common fasteners such as rivets or bolts and nuts. It is important that a sufficient number of holes 13 be provided to insure an adequate seal between the side members 10. The proper spacing of the holes 13 is highly dependent upon the material used for the side members and the loads placed on the fastening devices. Thus, the number of holes 13 required must be empirically determined for each enclosure configuration. A second set of flanges 14 are provided to add further structural rigidity to the flange 11 which aids in effecting a flat sealing surface 12. The inner surface of the side members 10 is lined with a layer 15 of soft inert plastic such as neoprene.

The two end seals 16 are each assembled from two mating end pieces. The body of the end pieces 17 is composed of a hard thin shell 18 which is most conveniently molded plastic such as polyethylene or polypropylene. The outer curved surface of the end pieces 17 have ridges 19. These ridges 19 improve the seal between the mated side members 10 and the end seals 16. The shell 18 is filled with a body of foamed plastic 20 such as styrofoam. The foamed plastic 20 is preferably bonded to the inner surface of the shell 18 by a suitable adhesive. The plastic filler 20 can be either cut to shape and then bonded in the shell 18 or foamed in place. The curved surface of the plastic shell 18 is constructed so as to provide for the end piece support member 21. The end piece support member 21 is composed of a semicircular body of strong rigid material such as aluminum. The member 21 is placed around the periphery of the end piece 17 to enhance its rigidity and to transmit a mating force when the seal is assembled. The member 21 should be recessed below the outer ridges 19 so as not to interfere with the seal created between the side members 10 and the ridges 19. It is advantageous to construct the member 21 so as to form a channel in cross section. The channel provides a light construction and yet allows sufficient tensile and flexure strength for its required function.

The two mating end pieces 17 are rigidly held together by two mechanical mating means which form part of the end adapters 22 provided on the body of the end piece support members 21. A preferred design for the mechanical mating means is the incorporation of threaded bolts 23 acting through suitably sized holes 24. On one of the two mating end pieces 17, the holes 24 should be threaded to accept the bolts 23. If the end piece support members 21 are to be made from aluminum, it is advantageous to provide a threaded insert to work in cooperation with the threaded bolts 23 to avoid any problems associated with threaded aluminum. It is advantageous to use threaded bolts 23 because they are capable of acquiring the mating end piece 17 before the end pieces are finally mated together. This allows the use of mechanical means to aid in mating the end pieces which can require substantial force when the device is used with large rigid cables.

Figure 5:
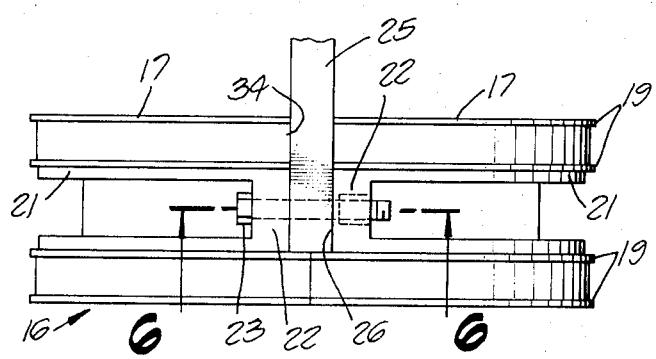
FIG. 5 is a top view of an end seal showing an alternate configuration.
Figure 4:
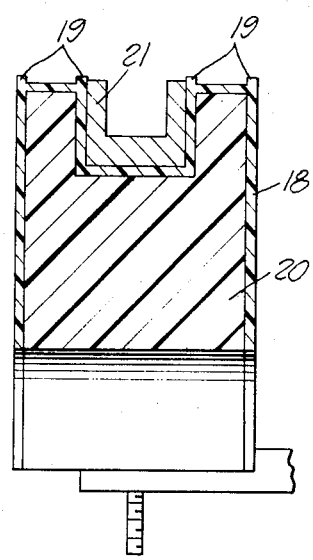
FIG. 4 is a cross section taken along line 4—4 of FIG. 3.
Figure 6:
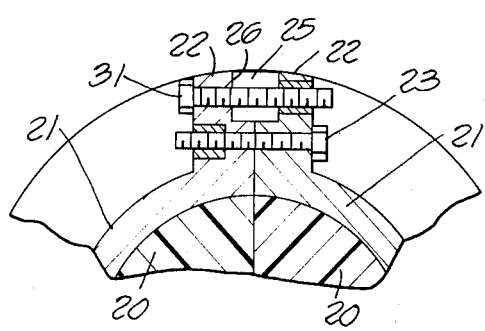
FIG. 6 is a cross-sectional view taken along line 6—6 of FIG. 5.

The adjustable alignment means for rigidly aligning the end seals 16 is shown as a rigid mechanical linkage made from a pair of rods 25 rigidly positioned within each end seal 16 in channels 26 provided in each end adapter 22. The channels 26 are also extended through the inside portion of each end piece 17 to accommodate the rods 25. The rods 25 are aligned and rigidly fixed relative to each other by a rigid coupling member such as a channel member 27 which is secured to each rod 25 by fasteners 28 such as the bolts illustrated. Adjustment of the alignment means is provided by having a plurality of selectable holes 29 through which the fasteners 28 may act. The holes 29 on one side of the channel member should be threaded to secure the bolts 28 in the member. Alternatively, nuts could be used in cooperation with the bolts 28. The rods 25 are restrained from being extracted from the channel 26 by having the bolt 23 pass through the rods 25. A retaining screw 30 is provided for ease of assembly. An alternative configuration for rigidly fixing the rod 25 to the end seal 16 is shown in FIGS. 5 and 6. In the alternate configuration, the rod is placed at the edge of the end seal 16 in order that it may be removed without demating the end pieces 17. A second bolt 31 is also provided to retain the rod 25 within the channel 26 in order that the bolt 23 need not be removed. A conductor clamp 32 is provided on one of the rods emanating from each of the end seals 16. The cable shields are then connected to the conductor clamps to form a completed junction through the rods 25 and adjustable connection 27. In this manner the shield wires need not come within dangerous range of contacting the cable splice illustrated as 33.

The splice case is assembled by first cutting the channels 34 in the end pieces 17. The device is illustrated with one channel but a multiple number of channels may be formed along the mating surface when a multiple number of cables are spliced. The cutting of the end walls 35 of the shell 18 can be accomplished by using a circular cutter or other similar tool. Once the end walls 35 have been cut to size, a suitable rasp, knife or other tool may be used to cut the filler plastic foam 20. A strip 36 of mastic or other suitable sealing material is laid across the mating surface of the end piece 16 so as to cover the channel 34. The cable 37 is then placed in the channel 34 with the strip 36 located between the cable 37 and the end piece 17. A second strip 36 is placed over the cable and the second end piece is then mated with the first end piece. The alignment rods 25 should be positioned in the end pieces 17 before the seal is assembled. After both end seals 16 have been assembled around the cables 37, the adjustable member 27 must be coupled to both alignment rods 25 to insure that the end seals 16 are properly aligned. The cable shields are then connected with the wire clamps 32 to form a proper electrical connection. Finally, the side members 10 are clamped about the splice and end seals thus completing the assembly of the splice case.

From the foregoing, it can be seen that a splice case is provided which is versatile in its application and easily assembled. Again, it should be mentioned that multiple channels 34 can be made in the various end pieces 17 where a multiple number of cables are to be spliced. Also, the splice cables may be of varying diameters as the channels 34 are fabricated at the time of assembly when compensations may be made.

The invention may be embodied in other specific forms not departing from the spirit or central characteristics thereof. The present embodiment is therefore to be considered in all respects illustrative and not restrictive, the scope of the invention being indicated by the appended claims rather than by the foregoing description and all changes which come within the meaning and range of equivalency of the claims are therefore intended to be embraced therein.

I claim:

1. An assembly for sealing both ends of a splice case, said assembly comprising a pair of end seals and adjustable means for rigidly aligning said end seals relative to each other; said end seals each comprising a pair of mating end pieces having channels provided across the mating surfaces thereof to accommodate one or more cables; means for securing said end pieces together, said securing means comprising an annular member located about the periphery of said mating end pieces, said annular member having means receiving said alignment means therein.

2. The device of claim 1 wherein said end pieces are hollow shell members filled with a body of cuttable foamed material impervious to the passage of air.

3. The device of claim 1, wherein said adjustable alignment means comprises a plurality of rigid members extending from said end seals and rigid coupling members; said rigid members and said coupling members being assembled to form rigid mechanical linkages between said end seals.

4. The device of claim 1, wherein said adjustable alignment means comprises a plurality of rigid members extending from said end seals, rigid coupling members, and conductor clamps; said conductor clamps being located in close proximity to each of said end seals; said rigid members and said coupling members being assembled to form rigid, conductive, mechanical linkages between said end seals.

5. The device of claim 1, wherein said alignment means comprises a plurality of rigid rods extending from said end seals and channel members bolted to said rods to form rigid mechanical linkages between said end seals.

6. The device of claim 1, wherein said adjustable alignment means comprises a plurality of rigid rods extending from said end seals and channel members bolted to said rods to form rigid mechanical linkages between said end seals; each of said channel members having a plurality of selectable holes for bolting said channel member to said rods in order that the effective length of said channel member may alternately be selected.

7. The device of claim 1, wherein said means for positioning said alignment means comprises channels cut across the mating surfaces of said end adapters of said end piece support members to accommodate said adjustable alignment means and tying means to prevent longitudinal movement of said adjustable means relative to said channels.

8. A means for sealing both ends of a splice case, said means comprising a pair of end seals and adjustable means for rigidly aligning said end seals relative to each other; said end seals each comprising a pair of mating end pieces having channels provided across the mating surfaces of said end pieces to accommodate cables passing through said end seals and means for rigidly fixing said adjustable alignment means to said end seals.

9. The device of claim 8, wherein said end pieces are hollow shell members filled with a body of cuttable foamed material impervious to the passage of air.

10. The device of claim 8, wherein said adjustable alignment means comprises a plurality of rigid members extending into the splice case from said end seals and rigid coupling members; said rigid members and said coupling members being assembled to form rigid mechanical linkages between said end seals.

11. The device of claim 8, wherein said adjustable alignment means comprises a plurality of rigid members extending from said end seals, rigid coupling members, and conductor clamps; said conductor clamps being located in close proximity to each of said end seals; said rigid members and said coupling members being assembled to form rigid, conductive, mechanical linkages between said end seals.

12. The device of claim 8, wherein said adjustable alignment means comprises a plurality of rigid rods extending from said end seals and channel members bolted to said rods to form rigid mechanical linkages between said end seals.

13. The device of claim 8, wherein said adjustable alignment means comprises a plurality of rigid rods extending from said end seals and channel members bolted to said rods to form rigid mechanical linkages between end seals; each of said channel members having a plurality of selectable holes for bolting said channel member to said rods in order that the effective length of said channel member may alternately be selected.

14. The device of claim 8, wherein said means for positioning said alignment means comprises channels cut across the mating surfaces of said end pieces to accommodate said adjustable alignment means and tying means to prevent longitudinal movement of said adjustable means relative to said channels.

15. The device of claim 8, wherein said end pieces each include an end piece support member.

* * * * *

Disclaimer 3,692,926.—*Donald J. Smith*, Canoga Park, Calif. ALIGNABLE END SEALS FOR A SPLICE CASE. Patent dated Sept. 19, 1972. Disclaimer filed Jan. 25, 1979, by the assignee, *Smith-Schreyer and Assoc., Inc.*

Hereby enters this disclaimer to all claims of said patent.

[*Official Gazette June 19, 1979.*]